(12) United States Patent
Nishizawa et al.

(10) Patent No.: US 11,452,256 B2
(45) Date of Patent: Sep. 27, 2022

(54) AUTO GUIDE VEHICLE

(71) Applicant: Meidensha Corporation, Tokyo (JP)

(72) Inventors: Yasuhiro Nishizawa, Tokyo (JP); Toshiyuki Ueno, Tokyo (JP); Yuya Matsushita, Tokyo (JP)

(73) Assignee: Meidensha Corporation, Tokyo (JP)

( * ) Notice: Subject to any disclaimer, the term of this patent is extended or adjusted under 35 U.S.C. 154(b) by 518 days.

(21) Appl. No.: 16/608,559

(22) PCT Filed: Apr. 27, 2018

(86) PCT No.: PCT/JP2018/017112
§ 371 (c)(1),
(2) Date: Oct. 25, 2019

(87) PCT Pub. No.: WO2018/199272
PCT Pub. Date: Nov. 1, 2018

(65) Prior Publication Data
US 2020/0189623 A1    Jun. 18, 2020

(30) Foreign Application Priority Data

Apr. 27, 2017    (JP) .............................. JP2017-087864

(51) Int. Cl.
*B61D 47/00* (2006.01)
*A01D 34/00* (2006.01)
(Continued)

(52) U.S. Cl.
CPC .......... *A01D 34/008* (2013.01); *B61D 47/00* (2013.01); *B60L 2260/32* (2013.01); *B60P 1/02* (2013.01);
(Continued)

(58) Field of Classification Search
CPC ... A01D 34/008; B61D 47/00; B60L 2260/32; B60P 1/02; F15B 13/042; F15B 2211/528
See application file for complete search history.

(56) References Cited

U.S. PATENT DOCUMENTS 5,075,853 A    12/1991    Luke, Jr.

FOREIGN PATENT DOCUMENTS

| JP | 5-162620 A | 6/1993 |
|---|---|---|
| JP | 9-25095 A | 1/1997 |

(Continued)

OTHER PUBLICATIONS

Machine Translation of JP10-105238.
(Continued)

*Primary Examiner* — Mathew Franklin Gordon
(74) *Attorney, Agent, or Firm* — Servilla Whitney LLC (57) ABSTRACT

An auto guide vehicle (20) that conveys a cart (10), wherein the auto guide vehicle (20) is provided with: a fluid pressure cylinder (22) that is able to be extended and retracted vertically, and that applies an upward pressing force to the floor surface of the cart (10); a fluid pressure supply device (70) that supplies a fluid to the fluid pressure cylinder (22); pressure regulating means (50) that regulates the fluid pressure of the fluid supplied from the fluid pressure supply device (70) to the fluid pressure cylinder (22); a control board (40) that outputs a fluid pressure command value to the pressure regulating means (50); and a pressure sensor (100) that detects the fluid pressure of the fluid supplied to the fluid pressure cylinder (22); wherein the control board (40) computes derivatives of the fluid pressure detected by the pressure sensor (100), estimates a timing at which the cart begins to leave the ground based on a pattern of the computed derivatives, and computes the command value by multiplying a coefficient less than one by the fluid pressure
(Continued)

detected by the pressure sensor (100) at the estimated timing.

5 Claims, 4 Drawing Sheets

(51) Int. Cl.
    *B60P 1/02*     (2006.01)
    *F15B 13/042*     (2006.01)

(52) U.S. Cl.
    CPC ....... *F15B 13/042* (2013.01); *F15B 2211/528* (2013.01)

(56) References Cited

FOREIGN PATENT DOCUMENTS

| | | |
|---|---|---|
| JP | 10-105238 A | 4/1998 |
| JP | 10-291798 A | 11/1998 |
| JP | 2004-107003 A | 4/2004 |
| JP | 2013-114307 A | 6/2013 |
| JP | 2017-47996 A | 3/2017 |
| JP | 2017-119451 A | 7/2017 |

OTHER PUBLICATIONS

Machine Translation of JP10-291798.
Machine Translation of JP2004-107003.
Machine Translation of JP2013-114307.
Machine Translation of JP2017-119451.
Machine Translation of JP2017-47996.
Machine Translation of JP5-162620.
Machine Translation of JP9-25095.

AUTO GUIDE VEHICLE

CROSS-REFERENCE TO RELATED APPLICATIONS

This application is the National Stage entry of PCT/JP2018/017112, filed on Apr. 27, 2018, which claims priority to Japan Application Number 2017-087864, filed on Apr. 27, 2017, which are incorporated herein by reference in their entireties.

TECHNICAL FIELD

The present invention relates to an auto guide vehicle. Specifically, the present invention relates to an auto guide vehicle that can stably transport a cart.

BACKGROUND ART

Patent Document 1 discloses a towing system in which a cart is coupled by pin-coupling to and towed by an auto guide vehicle (hereinafter abbreviated to AGV) that moves autonomously along guide paths provided on the floor surface of an assembly factory in order to transport components to assembly lines in the factory. In other words, this towing system involves providing coupling grooves in the bottom surface of a cart, and with the AGV ensconced under the floor of the cart, having the AGV couple with the cart by inserting coupling pins into the coupling grooves in the cart. Similar technologies are also disclosed in Patent Documents 2 and 3.

Patent Document 4 discloses technology in which an AGV is ensconced underneath a wagon and the wagon is completely lifted up with a lift device provided in the AGV. The lifted wagon is in a state in which the wheels have left the floor surface.

CITATION LIST

Patent Literature

Patent Document 1: JP H10-105238 A
Patent Document 2: JP 2013-114307 A
Patent Document 3: JP 2004-107003 A
Patent Document 4: JP H10-291798 A

SUMMARY OF INVENTION

Technical Problem

As described in Patent Documents 1, 2, and 3, a towing system involves modifying the bottom surfaces of carts to provide coupling grooves, thus increasing costs. Such cost increases are particularly significant in factories and product distribution centers in which there is a need to modify large numbers of carts. Additionally, in the case of towing systems, there was a need to make the AGV bodies heavy to keep the drive wheels from slipping.

In technologies in which the cart is completely lifted by a lift device provided in the AGV, as in Patent Document 4, the wheels of the cart leave the floor surface, so there was a risk of the cart tipping over if the cargo in the cart was unbalanced.

Therefore, the present inventors have proposed a related application (Japanese Patent Application No. 2015-255945).

In this related application, the weight balance remains unknown until the cart is completely lifted by approximately 20 mm and an upper-end limit switch of an air cylinder switches on.

For this reason, unless the air cylinder is moved so that a receiving plate that contacts the cart is made horizontal, there is a possibility that the cart will lean considerably, or the cargo on the cart will collapse.

Additionally, even if the weight is unbalanced, the air cylinder must be lifted to the maximum stroke, so there is a need to select the maximum load that can be expected to be applied to a single air cylinder and the pressure to be supplied to the air cylinder in order to lift the maximum load.

Solution to Problem

An auto guide vehicle according to claim 1 of the present invention, which solves the abovementioned problem, is an auto guide vehicle that conveys a cart by being ensconced in a standard space formed between a floor surface and a bottom surface of the cart, wherein the auto guide vehicle is provided with: a fluid pressure cylinder that is able to be extended and retracted vertically, and that applies an upward pressing force to the floor surface of the cart; a fluid pressure supply device that supplies a fluid to the fluid pressure cylinder; pressure regulating means that regulates the fluid pressure of the fluid supplied from the fluid pressure supply device to the fluid pressure cylinder; a control board that outputs a fluid pressure command value to the pressure regulating means; and a pressure sensor that detects the fluid pressure of the fluid supplied to the fluid pressure cylinder; wherein the control board comprises a differentiation circuit that computes derivatives of the fluid pressure detected by the pressure sensor; an estimation circuit that, based on a pattern of the derivatives computed by the differentiation circuit, estimates a timing at which the cart begins to leave the ground; and a coefficient multiplication circuit that computes the command value by multiplying a coefficient less than one by the fluid pressure detected by the pressure sensor at the timing estimated by the estimation circuit.

An auto guide vehicle according to claim 2 of the present invention, which solves the abovementioned problem, is an auto guide vehicle as in claim 1, wherein: the fluid pressure cylinder is formed by inserting a piston into a cylinder body so as to be able to move vertically, a receiving plate that contacts the bottom surface of the cart is provided on an upper end of a piston rod connected to the piston, and a proximity switch that switches on upon approaching to within a certain distance from the floor surface of the cart is provided on the receiving plate; and the estimation circuit estimates the timing at which the cart begins to leave the ground as being a time at which, with the proximity switch switched on, the derivative computed by the differentiation circuit has risen to a first prescribed value or higher, then fallen to a second prescribed value or lower.

An auto guide vehicle according to claim 3 of the present invention, which solves the abovementioned problem, is an auto guide vehicle as in claim 1, wherein the estimation circuit estimates the timing at which the cart begins to leave the ground as being a time at which, after a certain period of time has elapsed since the fluid pressure cylinder began to extend, the derivative computed by the differentiation circuit has risen to a first prescribed value or higher, then fallen to a second prescribed value or lower.

An auto guide vehicle according to claim 4 of the present invention, which solves the abovementioned problem, is an auto guide vehicle as in claim 1, wherein the estimation circuit estimates the timing at which the cart begins to leave the ground as being a time at which the derivative computed by the differentiation circuit becomes approximately zero.

An auto guide vehicle according to claim 5 of the present invention, which solves the abovementioned problem, is an auto guide vehicle as in claim 1, wherein, when there are multiple fluid pressure cylinders, the pressure regulating means and the pressure sensor are respectively provided on respective fluid pressure cylinders; and the coefficient multiplication circuit respectively outputs, to the respective pressure regulating means, command values corresponding to the pressures detected by the respective pressure sensors.

Advantageous Effects of Invention

In the auto guide vehicle of the present invention, the fluid pressure of a fluid supplied to a fluid pressure cylinder is detected by a pressure sensor, the derivative of the detected fluid pressure is computed by a differentiation circuit, the timing at which a cart begins to leave the ground is estimated by an estimation circuit based on the pattern of derivatives computed by the differentiation circuit, a coefficient less than one is multiplied, by a coefficient multiplication circuit, with the fluid pressure detected by the pressure sensor at the timing estimated by the estimation circuit, and the resulting value is output as a command value from a control board to a pressure regulating means. Thus, a fluid having a fluid pressure regulated by the pressure regulating means is supplied from a fluid pressure supply device to a fluid pressure cylinder, so that the total weight of the cart and the cargo loaded on the cart is distributed and supported not only by the wheels of the auto guide vehicle, but also by the wheels on the cart, thus allowing the cart to be stably transported.

DESCRIPTION OF EMBODIMENTS

Hereinbelow, the present invention will be explained in detail with reference to the embodiments shown in the drawings.

Embodiment 1

The AGV according to the first embodiment of the present invention is illustrated in FIGS. 1 to 4.

Figure 1:
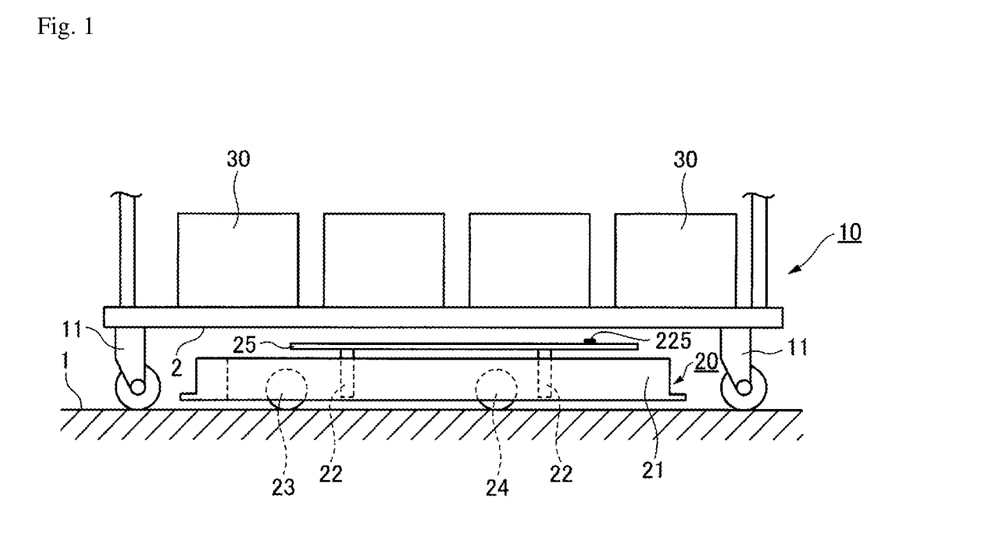
FIG. 1 is a side view of an auto guide vehicle according to a first embodiment of the present invention.
Figure 2:
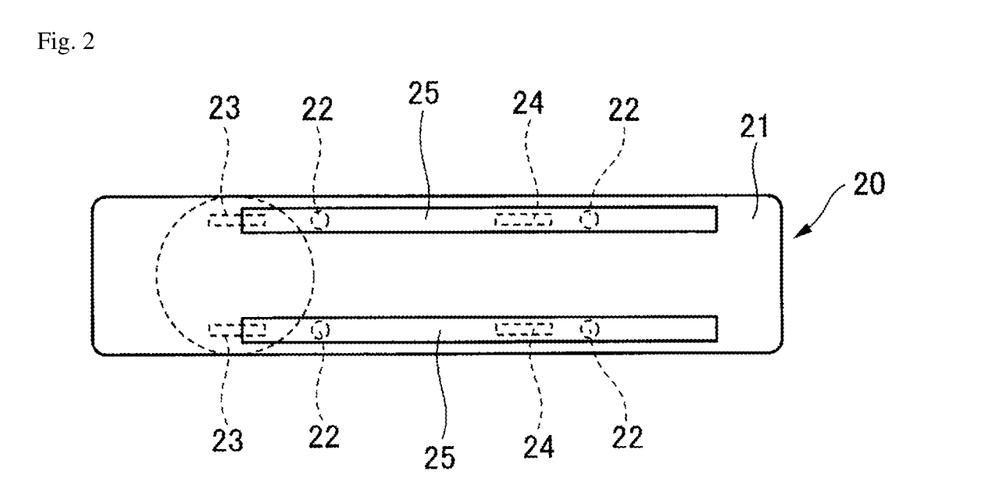
FIG. 2 is a plan view of an auto guide vehicle according to the first embodiment of the present invention.

As illustrated in FIGS. 1 and 2, an AGV 20 according to the present embodiment transports a cart 10 having multiple cargo items 30 on the upper surface thereof by being ensconced in a space underneath the bottom surface of the cart 10. The cart 10 has a standard space between a floor surface 1 and a bottom surface 2, and is provided with casters 11 as wheels at the four corners.

In the AGV 20, two drive wheels 23 having a turning function and two driven wheels 24 are provided on a vehicle body 21 that is lower than the space in the cart 10. Furthermore, air cylinders 22 that apply an upward pressing force to the bottom surface 2 of the cart 10 are installed at four locations to the left, right, front and rear.

The air cylinders 22 are able to be extended and retracted vertically, and horizontal receiving plates 25 are installed on the upper ends of front and rear air cylinders 22. In other words, two receiving plates 25 are provided, to the left and the right.

Therefore, when the air cylinders 22 are extended, the receiving plates 25 come into contact with the cart 10, and an upward pressing force is applied to the bottom surface 2 of the cart 10 by the receiving plates 25.

With the AGV 20 of the present embodiment, as long as the weight is within a set upper-limit carrying weight, if the air cylinders 22 are raised to the upper ends, the casters 11 of the cart 10 will leave the floor surface. On the other hand, if the air cylinders 22 are lowered to the lower ends, the casters 11 of the cart 10 will be grounded on the floor surface.

Figure 3:
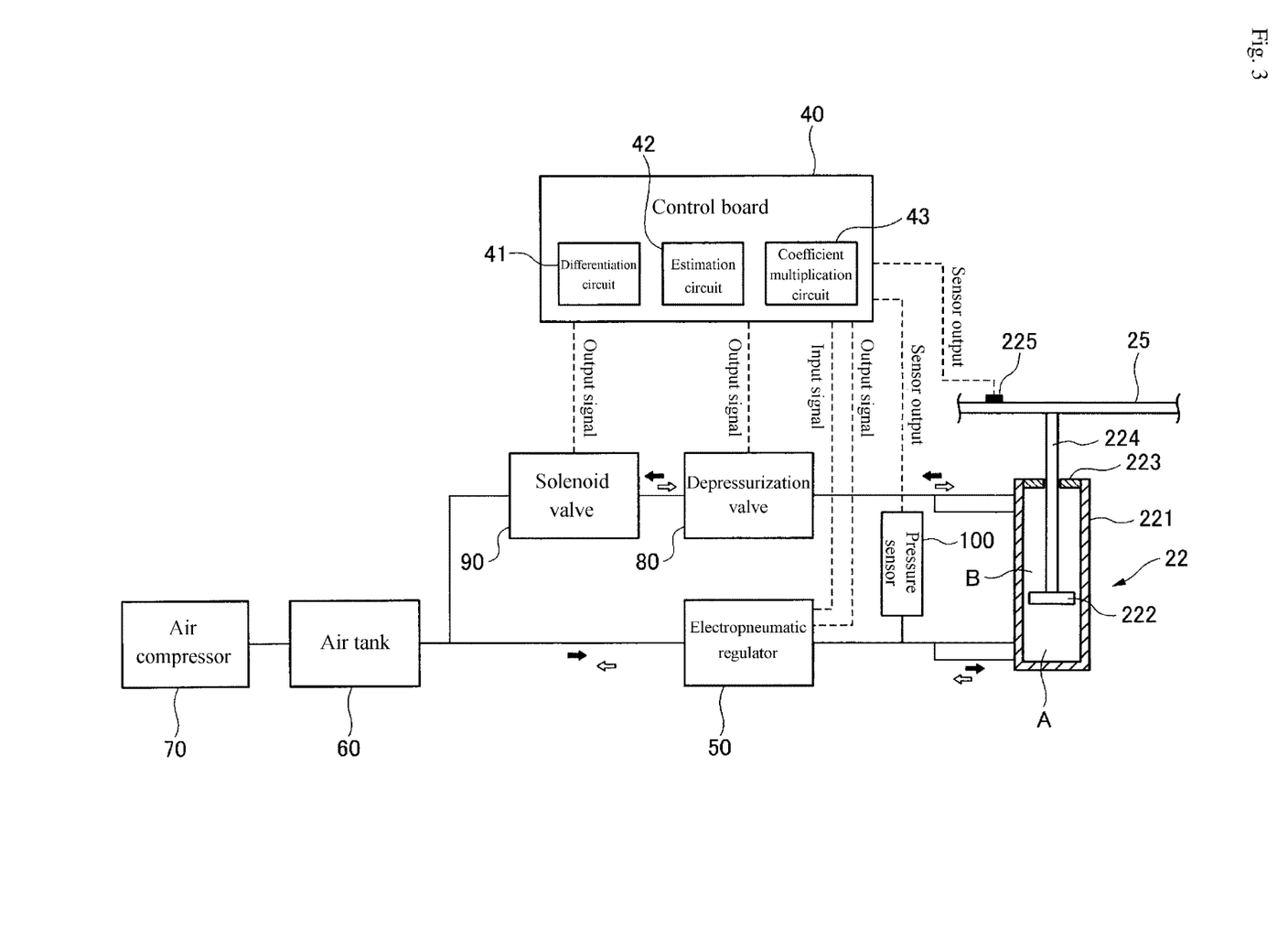
FIG. 3 is a pressure regulation system diagram for the auto guide vehicle according to the first embodiment of the present invention.

A compressed air supply device for supplying compressed air (air) to the air cylinders 22 and pressure regulating means for regulating the pressure of the compressed air supplied to the air cylinders 22 will be explained with reference to FIG. 3. FIG. 3 relates to the two front air cylinders 22. The two rear air cylinders 22 are similarly configured, so their explanations will be omitted.

As illustrated in FIG. 3, an air cylinder 22 is formed by inserting a piston 222 into a cylinder body 221 so as to be able to move vertically, and providing a stopper 223 for stopping the rising of the piston 222 at the upper end of the cylinder body 221. Furthermore, a piston 222 is connected to the lower end of the piston rod 224, which penetrates through the stopper 223. A receiving plate 25 for contacting the bottom surface of the cart 10 is installed on the upper end of the piston rod 224.

A proximity sensor 225 is provided on the upper surface of the receiving plate 25. The proximity sensor 225 switches on upon approaching close enough to the bottom surface of the cart 10 to come into contact therewith, and switches off upon withdrawing to a certain distance from the bottom surface of the cart 10. The on-off signals from the proximity sensor 25 are input, as sensor outputs, to a control board 40, as indicated by the dashed lines.

The cylinder body 221 is divided into two air chambers A, B by the piston 222 (in the drawing, A refers to the lower air chamber and B refers to the upper air chamber). An electropneumatic regulator 50, an air tank 60, and an air compressor 70 are connected, in this order, to the air chamber A, and a depressurization valve 80 and a solenoid valve 90 are connected, in this order, to the air chamber B.

Additionally, a pressure sensor 100 is attached between the air chamber A and the electropneumatic regulator 50. The pressure sensor 100 detects the pressure of compressed air supplied from the electropneumatic regulator 50 to the air chamber A (hereinafter referred to as the pressure in the air cylinder 22). The pressure detected by the pressure sensor 100 is input, as a sensor output, to the control board 40.

The air tank 60 and the air compressor 70 are compressed-air supply devices. The air compressor 70 generates compressed air and the air tank 60 stores the compressed air that has been generated.

The electropneumatic regulator 50 is a pressure regulating means that regulates the pressure of the compressed air supplied to the air chamber A in the air cylinder 22 based on a command value by an output signal from the control board 40. In FIG. 3, during the process of raising the piston 222, compressed air flows as indicated by the black arrows in the drawing, and during the process of lowering the piston 222, compressed air flows as indicated by the white arrows in the drawing.

The depressurization valve 80, based on a command by an output signal (command value) from the control board 40, reduces the pressure in the air chamber B of the air cylinder 22, and a solenoid valve 90, based on the output signal from the control board 40, releases the compressed air to the atmosphere.

Output signals are sent from the control board 40 to the electropneumatic regulator 50, the depressurization valve 80, and the solenoid valve 90, and input signals are sent from the electropneumatic regulator 50 to the control board 40. These electrical signals are indicated by dashed lines in FIG. 3.

Figure 4:
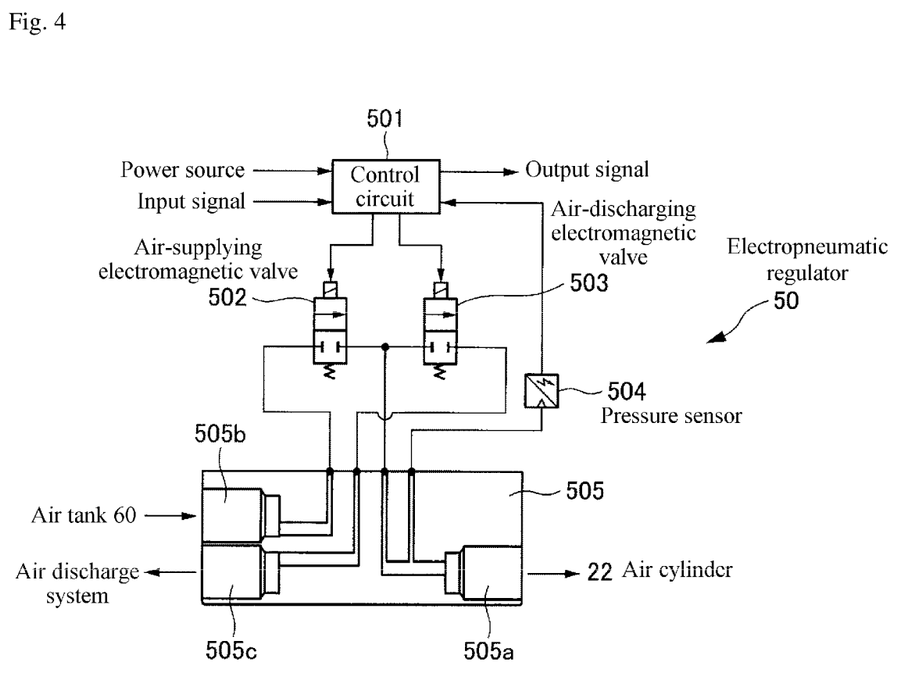
FIG. 4 is a schematic diagram of an electropneumatic regulator used in the auto guide vehicle according to the first embodiment of the present invention.

The electropneumatic regulator 50, as illustrated in FIG. 4, is composed of a control circuit 501, an air-supplying electromagnetic valve 502, an air-discharging electromagnetic valve 503, a pressure sensor 504, and a branched pipe 505.

The branched pipe 505 is provided with a pipe line 505a connected to the air cylinder 22, a pipe line 505b connected to the air tank 60, and a pipe line 505c connected to an air discharge system. The air-supplying electromagnetic valve 502 is provided between the pipe line 505a and the pipe line 505b. The air-discharging electromagnetic valve 503 is provided between the pipe line 505a and the pipe line 505c.

Therefore, when the air-supplying electromagnetic valve 502 is opened by the control circuit 501, the pipe line 505a and the pipe line 505b are connected, and compressed air flows from the air tank 60 to the air chamber A in the air cylinder 22. As a result thereof, the pressure in the air chamber A in the air cylinder 22 increases and the piston 222 rises.

Additionally, when the air-discharging electromagnetic valve 503 is opened by the control circuit 501, the pipe line 505a and the pipe line 505c are connected, and compressed air flows from the air cylinder 22 to an air discharge system. As a result thereof, the pressure in the air chamber A in the air cylinder 22 is reduced and the piston 222 lowers.

The pressure sensor 504 is connected to the pipe line 505a and detects the pressure of the compressed air supplied to the air chamber A in the air cylinder 22. The pressure detected by the pressure sensor 504 is converted to an output signal by the control circuit 501 and sent, as an input signal, to the control board 40.

As an input signal, the control circuit 501 is supplied with an output signal from the control board 40, and based on the pressure detected by the pressure sensor 504, regulates the pressure of the compressed air supplied to the air chamber A in the air cylinder 22 by opening and closing the air-supplying electromagnetic valve 502 and the air-discharging electromagnetic valve 503.

The control board 40 is a device that outputs, as an output signal to the electropneumatic regulator 22, which is a pressure regulating means, a command value for the pressure of the compressed air. The control board 40 is provided with a differentiation circuit 41, an estimation circuit 42, and a coefficient multiplication circuit 43.

The differentiation circuit 41 is a circuit for computing the derivative of the pressure in the air cylinder 22 detected by the pressure sensor 100.

The estimation circuit 42 is a circuit for estimating the timing at which the cart 10 begins to leave the ground based on the pattern of the derivatives computed by the differentiation circuit 41. The kinds of derivative patterns that are used for the estimate will be described below.

In this case, the timing at which the cart 10 begins to leave the ground refers to the timing at which the casters 11 on the cart 10 leave the floor surface and the total weight, which is the sum of the weight of the cart 10 and the weight of the cargo 30 loaded onto the cart 10, is supported solely by the air cylinders 22 of the AGV 20.

Figure 6:
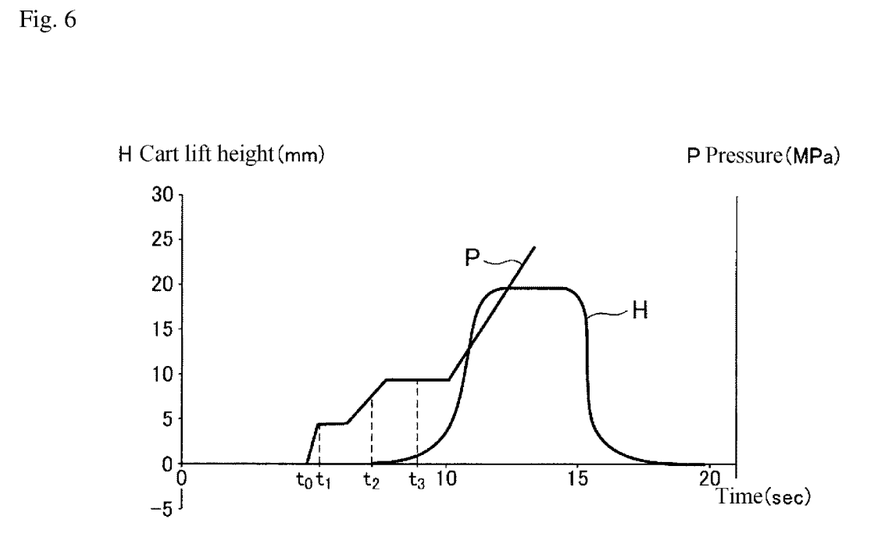
FIG. 6 is a graph showing, in superimposed fashion, the cart lift height and the pressure in an air cylinder.

For example, in FIG. 6, it refers to the tail regions where the height of the cart 10 rises comparatively gradually before rising suddenly.

The coefficient multiplication circuit 43 is a circuit that computes a command value to the electropneumatic regulator 22 by multiplying a coefficient less than one by the pressure detected by the pressure sensor 100 at the timing estimated by the estimation circuit 42.

When the command value computed in this way is output from the control board 40 to the electropneumatic regulator 22, the total weight, which is the sum of the weight of the cart 10 and the weight of the cargo 30 loaded on the cart 10, is not supported solely by the air cylinders 22, but is also supported by the casters 11 on the cart 10, which are grounded on the floor surface.

As a result thereof, the total weight of the cart 10 and the cargo 30 is distributed and supported not only by the two drive wheels 23 and the two driven wheels 24 on the AGV 20, but also by the four casters 11 on the cart 10. Thus, the cart 10 can be stably transported.

The pressure control of the electropneumatic regulator 50 by the control board 40 will be explained below.

When an input signal to the electropneumatic regulator 50 is supplied from the control board 40 in the form of a ramp function, the pressure in the lifting side (air chamber A) of the air cylinders 22 supporting the receiving plates 25 becomes greater, and the receiving plates 25 begin to rise. The pressure inside the air cylinders 22 remains approximately constant from the time at which the receiving plates 25 rise until they come into contact with the cart 10.

Furthermore, when the receiving plates 25 approach close enough to contact the cart 10, the proximity sensor 225 switches on. Thereafter, when the receiving plates 25 come into contact with the cart 10, the pressure in the air cylinders 22 gradually increases, and when the pressure in the air cylinders 22 rises further, the cart 10 begins to leave the ground. Furthermore, when the cart 10 is in a state in which it has gradually begun to leave the ground, the derivative of the pressure in the air cylinder 22 becomes small. In other words, the pressure is approximately constant.

As one example, the relationship between the pressure P in an air cylinder 22 and the cart lift height H is shown in FIG. 6.

As shown in FIG. 6, when the input signal is supplied to the electropneumatic regulator 50, the pressure P on the lifting side of the air cylinders 22 rises from the time $t_0$ to the time $t_1$ at which the receiving plates 25 begin to rise.

Furthermore, when the receiving plates 25 begin to rise at the time $t_1$, the pressure P inside the air cylinders 22 becomes approximately constant from the time $t_1$ until the receiving plates 25 come into contact with the cart 10.

Thereafter, when the receiving plates 25 approach near enough to come into contact with the cart 10, the proximity sensor 225 switches on. When the receiving plates 25 come into contact with the cart 10, the pressure P inside the air cylinders 22 gradually increases, and when the pressure P inside the air cylinders 22 further increases, the cart 10 begins to leave the ground at the time $t_2$. Thereafter, the lift height H of the cart 10 gradually increases from zero, and at the timing at which the cart 10 begins to leave the ground, the pressure P in the air cylinders 22 becomes approximately constant. For this reason, at the time $t_3$, which is some time after the cart 10 begins to leave the ground, the derivative of the pressure P in the air cylinders 22 becomes approximately zero.

When the derivative of the pressure P in the air cylinders 22 becomes approximately zero, even if the cart 10 is not lifted very much by the air cylinders 22, the total weight, which is the sum of the weight of the cart 10 and the weight of the cargo 30 loaded onto the cart 10, is supported solely by the air cylinders 22.

Thereafter, in FIG. 6, when the air cylinders 22 are lifted up to the maximum stroke, the pressure P inside the air cylinders 22 resumes increasing and the lift height H of the cart 10 suddenly rises and reaches the maximum value. In this state, some of the pressure P in the air cylinders 22 is applied to the stoppers 223.

From the above steps, the estimation circuit 42 estimates that the timing at which the cart 10 begins leaving the ground has been reached when the following conditions (1) to (3) are met:
(1) the proximity sensor 225 is on;
(2) the derivative of the pressure in the air cylinders 22 has risen to a first prescribed value (such as 0.03 MPa/s) or higher; and
(3) the derivative of the pressure in the air cylinders 22 has fallen to a second prescribed value (such as 0.05 MPa/s) or lower.

However, condition (3) must be met after condition (2) has been met. In other words, for conditions (1) to (3) to be met, with the proximity sensor 225 switched on, the derivative of the pressure in the air cylinders 22 must have risen to the first prescribed value or higher, then fallen to the second prescribed value or lower. It is necessary for the derivative pattern to at least satisfy conditions (2) and (3).

When such conditions (1) to (3) are met, the coefficient multiplication circuit 43 computes a command value by multiplying a coefficient less than one (such as 0.9) by the pressure value at the time of condition (3) above. The computed command value is output from the control board 40 to the electropneumatic regulator 50. Compressed air of a constant pressure is supplied from the electropneumatic regulator 50 to the air cylinder 22, thereby allowing the cart 10 to be supported with an appropriate pressure without the casters 11 of the cart 10 leaving the floor surface.

In other words, when the pressure applied from the electropneumatic regulator 50 to the air cylinders 22 is 0.9 times the pressure value at the time of condition (3) above, approximately 90% of the total weight of the cart 10 and the cargo is supported by the air cylinders 22, and the remaining approximately 10% is supported by the cart 10.

An even more optimal pressure can be obtained by changing the coefficient multiplied by the pressure value depending on the pressure value obtained at the timing of condition (3) above.

For example, when the pressure measurement value (MPa)<0.3 (MPa), the coefficient is set to 0.9, and when the pressure measurement value (MPa)>0.3 (MPa), the coefficient is set to 0.7.

In the abovementioned operation, it is also possible to omit the proximity sensor 225. For example, it is possible to determine the minimum pressure (for example, the pressure P in the air cylinders 22 at the abovementioned time $t_1$) for supporting the receiving plates 25 beforehand, and to have the estimation circuit 42 estimate that the timing at which the cart 10 begins leaving the ground has been reached on the basis of only the abovementioned conditions (2) and (3) if the pressure in the air cylinders 22 gradually increases for a certain period of time (a few seconds) after the minimum pressure has been applied to the air cylinders 22.

Furthermore, it is possible to estimate the timing at which the cart 10 begins leaving the ground based only on the derivative pattern.

For example, as shown in FIG. 6, there are two times at which the derivative of the pressure P in the air cylinders 22 becomes approximately zero.

First, between the time $t_1$ and the time $t_2$, there is a timing at which the derivative of the pressure P in the air cylinders 22 becomes zero, but at this stage, the cart 10 has not begun to leave the ground.

Furthermore, at the time $t_2$, the cart 10 begins to leave the ground, and after the time $t_2$, there is a timing at which the pressure P in the air cylinders 22 becomes constant, in other words, the derivative thereof becomes zero.

Therefore, the estimation circuit 42 estimates that the timing at which the cart 10 begins leaving the ground has been reached at the timing at which the derivative of the pressure P in the air cylinders 22 becomes zero for the second time.

The pressure value obtained for condition (3) above allows the wheels of the cart 10 to always remain grounded on the floor surface and the pressure necessary for transport to be applied, regardless of whether there is an unbalanced load on the cart 10. Thus, it is possible for the cart 10 to move, regardless of the manner in which the cargo has been loaded into the cart 10, the position of the center of gravity, or the weight.

In the present embodiment, the two front and the two rear air cylinders 22 are respectively controlled by a single electropneumatic regulator 50. However, the four air cylinders 22 may each be controlled by a single electropneumatic regulator 50. By controlling a single air cylinder 22 with a single electropneumatic regulator 50, it is possible to apply pressure in a complicated manner and to increase the robustness with respect to unbalanced loads.

When the drive wheels 23 are positioned towards the front as in the present embodiment, there is a risk that the drive wheels 23 will slip if the pressure in the rear air cylinders 22 is higher (if the load supporting the cart 10 is greater) than that in the front air cylinders 22.

For this reason, after the pressure values in the front air cylinders 22 have been determined in (3) above, if the pressure in the rear air cylinders 22 becomes a certain value (such as 0.2 MPa) or more greater than the values in the rear cylinders 22, a value obtained by adding a certain value to the pressure values in the front air cylinders 22 may be used as the pressure command values for the rear air cylinders 22 so as to keep the drive wheels 23 from slipping.

When each air cylinder 22 is lifted up by a pressure of 50% to 100% of the load from the cart 10, even if it is assumed that the maximum pressure that can be applied to the air cylinders 22 is 0.7 MPa, the pressure becomes 0.7×100(%)/50(%)=1.4 MPa. If the coefficient applied to the pressure when the wheels of the cart 10 have not left the ground is set to one, as mentioned above, it is possible to transport up to twice (1.4 MPa relative to 0.7 MPa) the pressure that can be applied to the air cylinders 22. Thus, the pressure of the air cylinders 22 can be determined even if the wheels of the cart 10 do not leave the ground.

Embodiment 2

The AGV according to the second embodiment of the present invention will be explained with reference to FIG. 5.

In comparison to the first embodiment, the present embodiment is characterized in that an electropneumatic regulator (not illustrated) and a pressure sensor (not illustrated) are each provided for regulating the pressure of the compressed air in each air cylinder 22a, 22b, 22c, and 22d provided at the front, rear, left, and right of the AGV 20. The remaining structures are the same as those in the aforementioned embodiment, so the same reference signs will be used and the explanations will be omitted.

Figure 5:
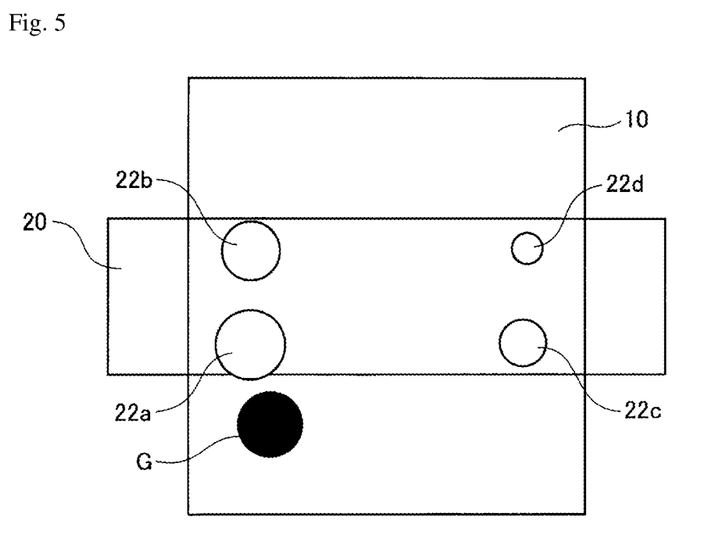
FIG. 5 is a plan view of an auto guide vehicle according to a second embodiment of the present invention.

The present embodiment, as illustrated in FIG. 5, is favorable for cases in which the center-of-gravity position G of the cart 10 including cargo is not at the center, in other words, an unbalanced load for the cart 10 including cargo.

When the center-of-gravity position G of the total weight of the cart 10 including the cargo is not at the center of the cart 10, as illustrated in FIG. 5, the total weight is not evenly shared by the four air cylinders 22a, 22b, 22c, and 22d. Instead, the proportional share becomes higher as the center-of-gravity position G becomes closer. For example, in the example in FIG. 5, as the sizes of the circles indicating the air cylinders 22a, 22b, 22c, and 22d become larger, this indicates that a higher proportion of the load is carried.

In the case of such an unbalanced load, the closer the air cylinders 22a, 22b, 22c, and 22d are to the center-of-gravity position G, the higher the proportion of the total load that is carried, as a result of which the pressure values detected by the respective pressure sensors provided in the respective air cylinders 22a, 22b, 22c, and 22d become higher.

The derivative of the pressure in each air cylinder 22a, 22b, 22c, and 22d detected by each pressure sensor is computed by a differentiation circuit (not illustrated), and based on each computed derivative pattern, the timing at which the cart 10 begins to leave the ground is estimated by the estimation circuit (not illustrated).

In this case, it is assumed that the cart 10 is kept in a horizontal state, and the estimated timing at which the cart 10 begins to leave the ground is the same based on any of the derivative patterns.

Then, command values are computed, in the coefficient multiplication circuit (not illustrated), by multiplying a coefficient (all the same) that is less than one by the respective pressures, in the air cylinders 22a, 22b, 22c, and 22d, detected by the pressure sensors at the same estimated timing, and these command values are respectively output from the control board (not illustrated) to the respective electropneumatic regulators.

The pressures in the air cylinders 22a, 22b, 22c, and 22d regulated by the respective electropneumatic regulators to which the command values have been respectively output in this way correspond to the proportions of the total weight that is to be carried by the respective air cylinders 22a, 22b, 22c, and 22d. In other words, the pressure becomes higher as the proportional share in the load becomes higher.

For this reason, even if the total weight of the cart 10 including the cargo is an unbalanced load, the weight is distributed and supported not only by the two drive wheels (not illustrated) and the two driven wheels (not illustrated) on the AGV 20, but also by the four casters (not illustrated) on the cart 10. Thus, the cart 10 can be stably transported while being kept horizontal.

In other words, the present embodiment has the advantage that, even if the cart 10 including the cargo is an unbalanced load, the cart 10 can be stably transported while being kept horizontal.

INDUSTRIAL APPLICABILITY

The present invention is widely applicable to industry as an auto guide vehicle that can stably transport a cart.

REFERENCE SIGNS LIST

1 Floor surface
2 Bottom surface
10 Cart
11 Caster
20 AGV (auto guide vehicle)
21 Vehicle body
22 Air cylinder
23 Drive wheel
24 Driven wheel
30 Cargo
40 Control board
41 Differentiation circuit
42 Estimation circuit
43 Coefficient multiplication circuit
50 Electropneumatic regulator
60 Air tank
70 Air compressor
80 Depressurization valve
90 Solenoid valve
100 Pressure sensor
225 Proximity switch

The invention claimed is:

1. An auto guide vehicle that conveys a cart by being ensconced in a standard space formed between a floor surface and a bottom surface of the cart, wherein the auto guide vehicle is provided with:
    a fluid pressure cylinder that is able to be extended and retracted vertically, and that applies an upward pressing force to the bottom surface of the cart;
    a fluid pressure supply device that supplies a fluid to the fluid pressure cylinder;
    pressure regulating means that regulates the fluid pressure of the fluid supplied from the fluid pressure supply device to the fluid pressure cylinder;
    a control board that outputs a fluid pressure command value to the pressure regulating means; and
    a pressure sensor that detects the fluid pressure of the fluid supplied to the fluid pressure cylinder; wherein
    the control board comprises:
    a differentiation circuit that computes derivatives of the fluid pressure detected by the pressure sensor;
    an estimation circuit that, based on a pattern of the derivatives computed by the differentiation circuit, estimates a timing at which the cart begins to leave the ground; and
    a coefficient multiplication circuit that computes the command value by multiplying a coefficient less than one by the fluid pressure detected by the pressure sensor at the timing estimated by the estimation circuit.

2. The auto guide vehicle as in claim 1, wherein:
    the fluid pressure cylinder is formed by inserting a piston into a cylinder body so as to be able to move vertically, a receiving plate that contacts the bottom surface of the cart is provided on an upper end of a piston rod connected to the piston, and a proximity switch that switches on upon approaching to within a certain distance from the bottom surface of the cart is provided on the receiving plate; and the estimation circuit estimates the timing at which the cart begins to leave the ground as being a time at which, with the proximity switch switched on, the derivative computed by the differentiation circuit has risen to a first prescribed value or higher, then fallen to a second prescribed value or lower.

3. The auto guide vehicle as in claim 1, wherein the estimation circuit estimates the timing at which the cart begins to leave the ground as being a time at which, after a certain period of time has elapsed since the fluid pressure cylinder began to extend, the derivative computed by the differentiation circuit has risen to a first prescribed value or higher, then fallen to a second prescribed value or lower.

4. The auto guide vehicle as in claim 1, wherein the estimation circuit estimates the timing at which the cart begins to leave the ground as being a time at which the derivative computed by the differentiation circuit becomes approximately zero.

5. The auto guide vehicle as in claim 1, wherein:

when there are multiple fluid pressure cylinders, the pressure regulating means and the pressure sensor are respectively provided on respective fluid pressure cylinders; and the coefficient multiplication circuit respectively outputs, to the respective pressure regulating means, command values corresponding to the pressures detected by the respective pressure sensors.

* * * * *